July 20, 1971  F. A. CLAESSENS  3,594,274
SELECTIVE MECHANICAL ALIGNING AND EQUALIZING MEANS FOR
ASBESTOS CEMENT TUBES
Filed April 21, 1969
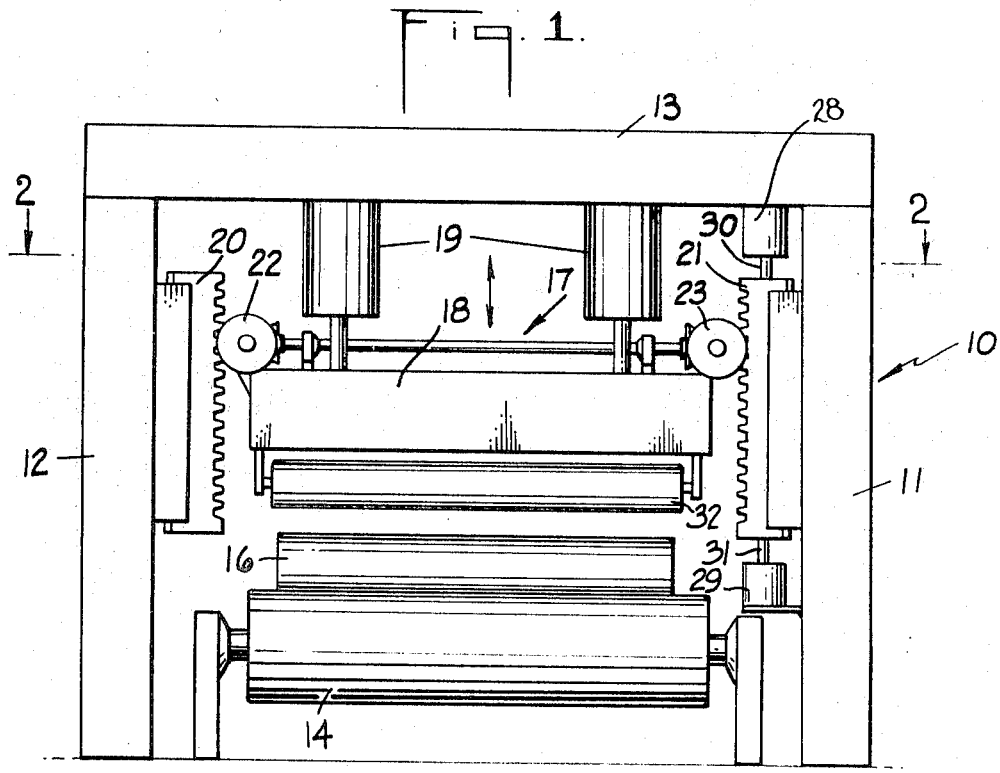
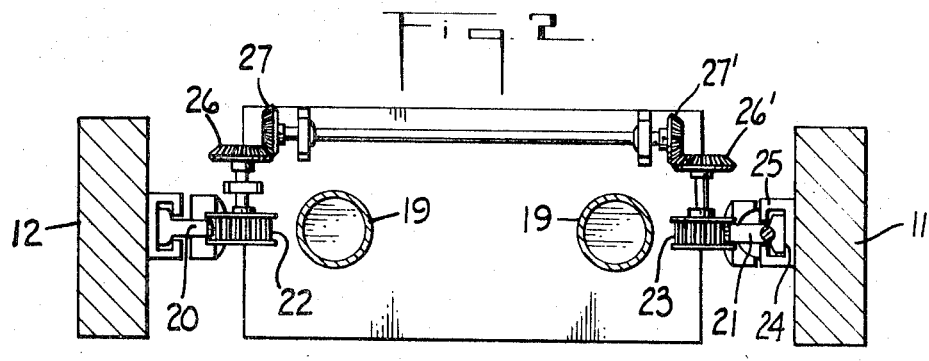
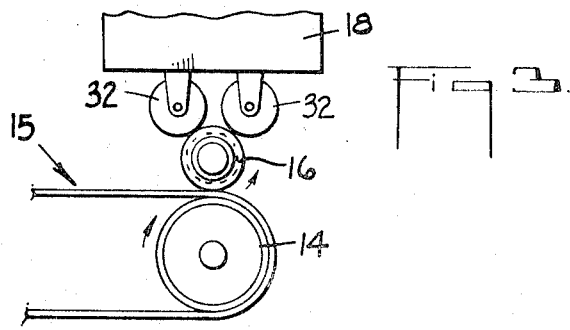
INVENTOR.
FRANK A. CLAESSENS
BY *John A. McKinney*
ATTORNEY United States Patent Office 3,594,274
Patented July 20, 1971

3,594,274
SELECTIVE MECHANICAL ALIGNING AND EQUALIZING MEANS FOR ASBESTOS CEMENT TUBES
Frank A. Claessens, Somerville, N.J., assignor to Johns-Manville Corporation, New York, N.Y.
Filed Apr. 21, 1969, Ser. No. 817,981
Int. Cl. B31c 1/00
U.S. Cl. 162—284
6 Claims

ABSTRACT OF THE DISCLOSURE

A mechanical system for maintaining positive parallel alignment of a press section or other unit carrying beam member in relation to a press base during movements of the beam member to and away from the press base. The beam member is lowered to make contact with the press base by hydraulic cylinders and is guided and positively aligned in parallel relation to the press base through gear racks and gear pinions on opposite sides of the beam member. One gear rack is rigidly fixed and the opposite gear rack being slidable up and down parallel to the rigidly fixed gear rack to achieve a pivotally movable press member capable of producing tapered articles for example tapered asbestos cement pipes. The pinion gears, mounted on each end of the beam member and meshed with their corresponding gear racks are connected through beveled gears so that the pinion gears rotate in unison. The slidable gear rack is held in position corresponding with the position of the fixed gear rack by fluid actuated cylinders with pistons making contact with the ends of the gear rack. The pistons can be deactivated, freezing the slidable gear rack to move pivotally in making tapered articles.

BACKGROUND OF THE INVENTION

One, and the most common means of manufacturing asbestos-cement products such as pipe and sheet building articles, comprises a continuous operation of collecting a thin wet sheet of an admixture of the components of the asbestos-cement material by filtering the same out on a porous belt from a dilute aqueous suspension, transferring the sheet of the components from the belt to a rotating accumulator roll or mandrel while convolutely winding the sheet thereabout to accumulate the materials in laminations thereon until a body of a desired mass is built up, and simultaneously therewith, compressing the convolute laminations of material as they are wound to consolidate the laminated layers into an integrated monolithic-like mass. This socalled wet forming technique, sometimes referred to as the Hatschek method after U.S. Pat. No. 769,078 and Re. 12,594, is carried out with an apparatus of a general type more fully illustrated and disclosed in Rembert Pat. Nos. 2,182,353, 2,246,537 and 2,322,592. As shown therein, the basic forming section of this type of apparatus constitutes a unit comprising: an anvil roll which carries one extremity of the material transfer belt and provides a fixed, rotating base or press platen for the compression of the material, as well as rotating drive means; a forming mandrel for the accumulation and consolidation thereon of the asbestos-cement material which is carried on the anvil roll and rotated by the force of the rotation of the anvil roll; and a press section adjacent to the mandrel roll riding on the anvil roll, and located generally opposite to the anvil roll. Each of the said basic components of the forming unit is aligned longitudinally parallel to each other, and the axis of rotation of the anvil roll and mandrel roll are each in the same plane. The force applied by the press section is also directed generally in alignment with the same said plane passing through the axis of rotation of each mandrel and anvil roll whereby consolidating pressure can be applied by the force of the movable press section and the fixed anvil roll upon the intermediate mandrel substantially through its axis of rotation to consolidate the material accumulated thereon without separating, dislocating or rupturing the laminations. Contemporary asbestos-cement forming apparatus, illustrating the arrangement and function of the anvil roll, mandrel and press section, are disclosed in U.S. Letters Pat. Nos. 3,000,776; 3,271,236; and 3,382,309.

With this type of apparatus, and its arrangement, the press section must be mounted for intermittent movement to and from its work station, comprising an operating position of contact with the mandrel and/or the material accumulated thereon, and a withdrawal location away from operating position to permit the introduction of a mandrel and/or its removal upon completion of formation of the material thereon. These movements of the press section to and from operating position and its initial positioning in contact with the mandrel for the commencing of accumulation and compacting thereon, must all be carried out while the press section is substantially parallel aligned with the mandrel, but during its operation of applying a continuous and substantially uniform compressive force along the length of the mandrel and/or the accumulated material thereon to effect even consolidation, the press section must be free to both recede back away from the mandrel to accommodate the increasing thickness of the body of the accumulating material on the mandrel and to permit free floating pivotal movement to follow the contour of the body of material being formed by progressive accumulation including accommodating any irregularities in the material accumulated or its formation at an angle on the mandrel in a slight conical taper as might result from uneven filter collection and depositing of the asbestos-cement material across the transfer belt.

Moreover, these positions and motions requiring parallel alignment during transfer to and from the work station or operating location and of the free receding and floating pivotal movement for the press section, must be provided for while prohibiting any other relative movements or shifting between the anvil roll, the mandrel and the press section or force applied thereby, throughout the forming operation which to be effective necessitates the rigid maintaining of alignment of these units in the same plane, that is, with the rotating axis of the anvil roll and mandrel aligned in the same plane and with overall direction of the force applied by the press section, which component commonly constitutes a multiplicity of rolls with some straddling the plane of the axis of rotation of the other units, generally centered with said plane.

The means for effecting the required alignments of these components of the forming unit and force applied thereby together with the positioning, and receding and floating movement of the press section, have heretofore constituted highly involved hydraulic control means or mechanical arrangements.

SUMMARY OF THE INVENTION

This invention comprises a relatively uncomplicated combination and arrangement of gear racks and gear pinions associated with fluid actuated cylinder and piston means which are adaptable to wet forming asbestos-cement machines and similar press devices to provide positive alignment of a beam member carrying a press section or the like means, parallel in relation to a cooperating work station such as a press base or anvil roll during the intermittent reciprocative to and from movement of the beam member into and out of operating or pressing position, and thereafter in cooperation with a work station such as a press base, maintain an overall uniform compressive force while permitting free recession and pivotal floating movement of the beam throughout its pressing or other working cycle.

The primary objective of this invention is to provide a system of simple mechanical means and arrangement essentially composed of common and low cost mechanical components which positively parallel aligns the press section or beam member for intermittent reciprocative movement to and from operating position, and thereafter in operation, while maintaining uniform pressure over its extent, permits a receding movement of the press section or beam member and its free floating pivotal movement to accommodate the contour of the material being worked on as it applied overall even compression.

DESCRIPTION OF THE DRAWINGS

FIG. 1 is a front elevational view of the apparatus of this invention.

FIG. 2 is a cross-section view of the apparatus of FIG. 1 taken along line 2—2, and, FIG. 3 is an end view showing the relative arrangement of the basic forming components shown in FIG. 1.

DETAILED DESCRIPTION OF THE PREFERRED EMBODIMENT

With reference to the drawings, there is illustrated in several views a forming and press section of a typical asbestos-cement wet forming machine for the manufacture of pipe, including a supporting frame and guide 10 composed of two vertical posts 11 and 12 and a cross support 13 bridging the span between posts 11 and 12 from top to top thereof. Posts 11 and 12 are aligned parallel to each other since they function as guides as well as supports for the pressing means.

Positioned generally intermediate posts 11 and 12 is anvil roll 14 which, as is conventional, carries thereabout one end of the collection and transfer belt 15 as shown in FIG. 3, for the conveying of a thin wet sheet of the admixture of asbestos-cement materials to an accumulator roll or mandrel 16. In the forming operation, a mandrel 16 is positioned upon and carried by anvil roll 14 as shown, whereby it is rotated by the revolving anvil roll and the admixture of ingredients of the wet sheet of asbestos-cement material carried by the belt 15 is transferred to the mandrel and convolutely wound thereabout and the laminations of the material accumulated thereon until the thickness of the body is built up in amount to that desired. Mandrel rolls 16 are inserted into forming position on the anvil roll 14 to function as a collecting form for the formation of pipe products, and upon completion of the forming operation are withdrawn therefrom. To provide good contact between the mandrel 16 and the asbestos-cement material carried on the belt 15 for effective transfer of the material to the mandrel and to consolidate the convolutely wound laminations of the material accumulated thereon into a body of integrated continuous and uniform mass, it is necessary to apply a compressive force substantially evenly along the length of the mandrel rotating on the turning anvil roll. Such a force normally is in excess of about 200 or 300 lbs. per linear inch along the length of the mandrel or the material accumulating thereon, and typically in the order of about 500 lbs., per linear inch, to achieve optimum integration of the laminations into a continuous high density mass for premium products such as high pressure pipe.

As should be apparent, this compressing force, applied by the press section, must be applied substantially uniformly along the length of the material and article forming on the mandrel, and generally aligned in the plane of its axis of rotation and in turn with the axis of rotation of the cooperating anvil roll to avoid separation, displacement and/or tearing of the accumulating laminations of material on the mandrel. However, as indicated hereinbefore, in addition to the substantially uniform application of pressure along the length of the forming article and aligned therewith to attain uniform consolidation and consistency, means must be provided to accommodate the increasing thickness of the body of the article being formed through the convoluted accumvulations and also to accommodate irregularities in the stock accumulation or contour including for example the possibly somewhat unequal collection of the asbestos-cement materials on the belt, such as transversely across it, and in turn unequal transfer and accumulation on the mandrel whereby it is built up at a small angle along the length of the mandrel forming a body thereon of a slight conical taper. Although such foregoing conditions mush be provided for, the compressing force must nevertheless be continuously applied uniformly along the length of the mandrel, without lateral movement, in the same direction as the plane passing through the rotating axis of the mandrel 16 and anvil roll 14, to obtain an even consolidation of the convolutely accumulated material about the mandrel and in turn uniform consistency and maximum strength of the mass of the body being formed.

To achieve this consolidation, typical wet forming asbestos-cement apparatus are provided with a press section generally shown as 17, comprising a horizontal beam member 18, moved and compressively activated by means of one or more hydraulic cylinders 19 supported, for example, from cross support 13 bridging posts 11 and 12. Supporting posts 11 and 12 also usually function as restraining guide posts to maintain alignment of the press section 17 by appropriate keying means (not shown) with beam member 18 to inhibit lateral movement during reciprocative movement to and from working position and in making initial contact with the cooperating work station comprising the mandrel and anvil roll, as well as during forming.

The apparatus and means of this invention for attaining and maintaining positive parallel alignment of a press section or other unit carrying beam member in relation to a press base or cooperating work station during intermittent positioning movements of the press section or beam member to and away from the base or cooperating work station, and also for permitting free recession and pivotal floating movement of the press section or beam during the pressing or other working operation while in functioning position with the cooperating press or work station, specifically comprises the following system of mechanical components and their arrangement which cooperate to more effectively achieve the foregoing prescribed essential movements in asbestos-cement forming apparatus and related pressing and similar devices.

Referring particularly to the press section 17 of the forming apparatus, the beam member 18, which is both press motivated and reciprocatively moved to and from working position through hydraulic cylinders 19, is both guided and positively aligned in parallel relation to either the anvil roll or the forming mandrel supported and carried thereon, through a mechanical connecting means comprising a pair of gear racks 20 and 21 mounted on support posts 12 and 11 respectively. Beam member 18 is joined in movable relation to the gear racks 20 and 21 by means of a pair of rotatable gear pinions 22 and 23 mounted on each end of the beam 18 and respectively functionally meshed with their corresponding gear racks 20 and 21 positioned on posts 12 and 11. One gear rack, 20, is permanently mounted in rigid fixed relationship with post 12, and the other opposite gear rack 21 is mounted in movable relation with post 11, being slidable up and down its vertical axis. As shown in FIG. 2, gear rack 21 may be keyed by means of a pair of transverse flanges within a slotted mounting means 25 fixed to post 11 to permit sliding movement of gear rack 21 in a vertical relation in alignment with post 11 while inhibiting movement in other directions. Gear pinions 22 and 23, functionally meshed with gear racks 20 and 21 respectively, rotate in unison through a simple mechanical interlocking connection comprising, for example, a pair of bevelled gears 26, 26' and 27, 27' suitably mounted on beam member 18 and connected by a common shaft, whereby the reciprocative to and from movement of beam member 18 into and out of working position is fixed in relation to both gear racks 20 and 21.

Positioned in spaced relation from either end of slidable gear rack 21, are a pair of fluid actuated cylinders 28 and 29 with facing piston means 30 and 31 aligned to make contact with the ends of gear rack 21. Hydraulic cylinders 28 and 29 and their corresponding pistons 30 and 31 are so positioned and pre-adjusted whereby upon actuation with each piston rod fully extended, the slidable gear rack 21 is aligned with the opposing fixed gear rack 20 and there held fixed therebetween rigidly in aligned position. Although common hydraulic cylinders are preferred as means for fixing the position and rigidly holding vertically movable gear rack 21, it should be appreciated that other equivalent mechanical expedients, such as electrically energized solenoids, manual or mechanically activated screw mechanisms, or simply brackets, will physically perform this function.

In operation, hydraulic cylinders 28 and 29 are actuated with each respectively extending its piston rod 30 and 31 to their maximum extent which positions and securely holds fixed in position the slidable gear rack 21 in equalized aligned vertical relationship with that of the opposing gear rack 20. Upon placing a mandrel 16 on the revolving anvil roll 14 to begin the forming cycle, hydraulic press cylinders 19 are actuated, moving press section 17 comprising beam member 18 carrying thereon press rolls 32 downwardly until contact is made between press rolls 32 and mandrel 16, and the desired degree of pressure for forming applied thereon. During the descent of press section 17, the pinion gears 22 and 23 functionally meshed with now both fixed gear racks 20 and 21, rotate in unison through their mechanical interlocking connection of bevelled gears 26′, 26 and 27′, 27, maintaining a fixed positive alignment of the descending press section 17 parallel to the work station comprising mandrel 16 and/or anvil roll 14. Upon reaching the termination of the descent consisting of the press rolls 32 making contact with the mandrel 16 and pressing thereon, and beginning formation through the transfer of asbestos-cement material to and its accumulation on the rotating mandrel, hydraulic cylinders 28 and 29 are deactivated freeing slidable gear rack 21 to move within member 25 on post 11, and thus in an aligned plane with the axis of rotation of the mandrel 16 and anvil roll 14.

During the accumulating forming operation even compression is appiled to the convolutely accumulated laminations of asbestos-cement material on mandrel 16 along its length and in alignment with its rotating axis, press rolls 32 mounted on beam member 18 of press section 17 by means of the hydraulic cylinders 19 which are usually connected to beam 18 with ball and socket contacts (not shown) or other appropriate mechanisms permitting relative movement between the beam and the cylinders while maintaining the uniform application of pressure. Thus, when gear rack 21 is released by deactivating hydraulic cylinders 28 and 29 and thereby permitted free sliding movement, the press section 17 is no longer positively held mechanically in fixed parallel relation to the work station and it is free to both recede away from the work station to accommodate the increasing thickness of the forming body of material accumulating on the mandrel and also to float in pivotal movement to accommodate irregularities in the supplied material following its contour, in particular angular formation on the mandrel in a slight conical taper while maintaining uniform application of pressure of the press rolls 32 along the length of mandrel 16. Moreover, the arrangement inhibits relative movement in any other directions between the press section or the press rolls carried thereby, and the mandrel and the anvil roll, preventing the introduction of askew destructive forces upon the accumulating material through the high compression applied and thus maintaining complete stability of force aligned through the contacting and interacting components of the anvil rolls, mandrel and press section.

Although the means of this invention are particularly directed to an improvement in the operation of conventional asbestos-cement pipe and other asbestos cement article wet forming machines, it is amendable to use in other pressing operations and related apparatus as a selective mechanical equalizer to maintain parallel motion of any mechanical component with selectively removable restraining means controlling the parallel motion.

I claim:

1. Apparatus for attaining and maintaining positive parallel alignment of a beam member in relation to means comprising a cooperating work station during positioning movements of the beam member to and from the cooperating work station means and for permitting free pivotal floating movement of the beam during working operation in position with the cooperating work station, comprising:
   (a) means providing a work station;
   (b) a pair of parallel guide members extending adjacent to said means providing the said work station;
   (c) a beam member arranged generally parallel to the said work station and extending between said parallel guide members, said beam member being movably secured to said guide member for reciprocative movement within the confines of the said guide members to and from said means comprising the work station through mechanical connecting means comprising:
      (1) a gear rack extending along one guide member in fixed relationship thereto;
      (2) an opposing gear rack extending along the other guide member mounted for free sliding movement parallel to the longitudinal axis of the said guide member;
      (3) removable means provided to contact the said gear rack mounted for free movement and align the same with the opposing fixed gear rack and hold the said movable gear rack fixed in such aligned position when the removable means are actuated, and release the said gear rack for free movement when deactuated; and,
      (4) a pair of gear pinions mounted on the beam member adjacent its ends with each of said gear pinions mechanically interlocked to rotate in unison and movably secured with the guide confines and respectively in meshing operative relationship with the said fixed and the said movable gear racks;
      (3) whereby when the movable gear rack is aligned with its opposite fixed gear rack and thus held in position by actuation of the removable aligning and fixing means, the said beam member can be moved within the confines of the guide members to and from the working station while maintained in parallel relationship thereto through the interlocked connection of the in unison rotating gear pinions with the gear racks, and upon positioning the beam member for working operation with the cooperating work station it will pivot freely in floating movement upon deactivation of the removable gear rack aligning and fixing means releasing the gear rack for free movement.

2. The apparatus of claim 1 wherein the removable means provided to contact and align the gear rack mounted for free movement and thus hold it fixed in position, comprise a pair of opposing fluid actuated cylinders each provided with piston means arranged to cooperatively grip therebetween the movable gear rack and align its position with that of the other fixed gear rack and thus hold it in fixed relationship.

3. A pressing apparatus including means for attaining and maintaining positive parallel alignment of a press carrying beam member in relation to means comprising a cooperating press work station during positioning movements of the press carrying beam member to and from the cooperating press work station means and for permitting free pivotal floating movement of the press carrying beam member during press working operations in position with the cooperating press working station, comprising:

(a) means providing a press working station;

(b) a pair of parallel guide members extending adjacent to the said means providing the said press working station;

(c) a press carrying beam member arranged generally parallel to the said work station and extending between said parallel guide members, said beam members being movably secured to said guide members for reciprocative movement within the confines of the said guide members to and from means comprising a press working station through mechanical connecting means, comprising;

(1) a gear rack extending along one guide member in fixed relationship thereto;

(2) an opposing gear rack extending along the other guide member mounted for free sliding movement parallel to the longitudinal axis of the said other guide member;

(3) removable means provided to contact the said gear rack mounted for free movement and align it with the opposing fixed gear rack and hold the movable gear rack fixed in such aligned position when the removable means are activated, and release the said gear rack for free movement when deactivated; and, (4) a pair of gear pinions mounted on the press carrying beam member adjacent its ends with each of said gear pinions mechanically interlocked to rotate in unison and movably secured within the guide confines and respectively in meshing operative relationship with the said fixed and the movable gear racks;

whereby when the movable gear rack is aligned with its opposite fixed gear rack and thus held by actuation of the removable aligning and fixing means, the said press carrying beam member can be moved within the confines of the guide members to and from the press work station while maintained in parallel relationship thereto through the connection of the interlocked in unison rotating gear pinions with the gear racks, and upon positioning the press carrying beam member for press working operations with the cooperating press work station it will pivot freely in floating movement upon deactivation of the removable gear rack aligning and fixing means releasing the gear rack for free movement.

4. The press apparatus of claim 3 wherein the removable means provided to contact and align the gear rack mounted for free movement and thus hold it fixed in position comprises a pair of opposing fluid actuated cylinders each provided with a piston means arranged to cooperatively grip therebetween the movable gear rack and align its position with that of the other fixed gear rack and thus hold it in fixed relationship.

5. Apparatus for manufacturing asbestos-cement pipe by accumulating and consolidating to a continuous integrated mass an admixture of asbestos fiber reinforced cementitious materials convolutely laminated about a mandrel, comprising:

(a) a supported anvil roll provided with means to rotate same;

(b) a mandrel for convolutely winding and accumulating laminations of cementitious material thereabout, carried on the said rotatable anvil roll;

(c) a press means comprising a roll adapted to ride on the said mandrel approximately opposite to the anvil roll carrying the said mandrel for applying compressive force thereto approximately in a plane passing through the longitudinal axis of the mandrel and the anvil roll to consolidate the convolute laminations of cementitious material accumulated on the mandrel;

(d) a pair of parallel guide members extending from adjacent the ends of the anvil roll;

(e) a beam member arranged generally parallel to the said anvil roll and carrying the said press means comprising a roll and extending between said parallel guide members, said beam member being movably secured to the said guide members for reciprocative movement within the confines of said guide members to and from the location of the mandrel carried on the anvil roll through mechanized connecting means, comprising:

(1) a gear rack extending along one guide member in fixed relationship thereto;

(2) an opposing gear rack extending along the other guide member mounted for free sliding movement parallel to the longitudinal axis of the said other guide member;

(3) removable means provided to contact the said gear rack mounted for free movement and align the same with the opposing fixed gear rack and hold the said movable gear rack fixed in such aligned position when said removable means is activated, and release the said gear rack for free movement when deactivated; and, (4) a pair of gear pinions mounted on the press means adjacent its ends with each of said gear pinions mechanically interlocked to rotate in unison and movably secured within the guide confines and respectively in meshing operative relationship with the said fixed and said movable gear rack;

whereby when the said movable gear rack is aligned with its opposite fixed gear rack and thus held by actuation of the removable aligning and fixing means, the said press rolls can be moved within the confines of the guide members to and from the mandrel carried on the anvil roll while maintained in positive parallel relationship thereto through the connection of the interlocked in unison rotating gear pinions with the gear racks, and upon positioning the press roll means for pressing operation upon the mandrel carried on the anvil roll the said press roll means will pivot freely in floating movement upon deactivation of the removable gear rack aligning and fixing means.

6. The asbestos-cement manufacturing apparatus of claim 5 wherein the removable means provided to contact and align the gear rack mounted for free movement and thus hold it fixed in position comprises a pair of opposing hydraulic actuated cylinders each provided with piston means arranged to cooperatively grip therebetween the movable gear rack and align its position with that of the other fixed gear rack and thus hold it in fixed relationship.

References Cited

UNITED STATES PATENTS

| | | | |
|---|---|---|---|
| 1,037,671 | 9/1912 | Seigle | 162—284 |
| 2,479,759 | 8/1949 | Merchant | 100—170 |
| 3,155,029 | 11/1964 | Thomas | 100—170 |
| 3,196,615 | 7/1965 | Kautz | 100—170 |

S. LEON BASHORE, Primary Examiner

R. H. ANDERSON, Assistant Examiner

U.S. Cl. X.R.

25—30; 100—170; 264—312